COMPLEMENTARY TRANSISTOR WRITE AND NDRO FOR MEMORY CELL

Filed May 2, 1967 4 Sheets-Sheet 1

INVENTOR
STANLEY KATZ
BY H. Christoffersen
ATTORNEY

INVENTOR
STANLEY KATZ
BY H. Christoffersen
ATTORNEY

COMPLEMENTARY TRANSISTOR WRITE AND NDRO FOR MEMORY CELL

INVENTOR
STANLEY KATZ
BY H. Christoffersen
ATTORNEY

July 21, 1970 S. KATZ 3,521,242

COMPLEMENTARY TRANSISTOR WRITE AND NDRO FOR MEMORY CELL

Filed May 2, 1967 4 Sheets-Sheet 4

INVENTOR
STANLEY KATZ

BY H. Christoffersen
ATTORNEY

United States Patent Office 3,521,242

Patented July 21, 1970

3,521,242

COMPLEMENTARY TRANSISTOR WRITE AND NDRO FOR MEMORY CELL

Stanley Katz, East Brunswick, N.J., assignor to RCA Corporation, a corporation of Delaware Filed May 2, 1967, Ser. No. 635,591

Int. Cl. G11c *11/40;* H03k *3/286;* H01l *11/14*

U.S. Cl. 340—173 8 Claims

ABSTRACT OF THE DISCLOSURE

Various active memory cell arrangements, each of which includes a four transistor flip-flop with negligible impedance cross-coupling. In each case, at least one transmission gate transistor is connected between a common input/output point of the flip-flop and a common digit input-sense output line. The gate transistor is employed both for write-in and read-out, and current sensing is employed on the input-sense line during read-out.

The invention herein described was made in the course of or under a contract or subcontract thereunder with the Department of the Air Force.

BACKGROUND OF THE INVENTION

The present invention relates to active memory cells, to memory organizations of such cells and, in particular, to improved means for writing into and reading out of such cells.

A memory arrangement of active cells, each employing four insulated-gate field-effect transistors cross-coupled by negligible impedance means, is illustrated at p. 93 of an article entitled "MOS Integrated Circuits Save Space and Money," appearing in the Oct. 4, 1965 issue of Electronics. In that arrangement, two digit lines are employed for each column of cells, and each cell of a column is coupled to each of the two digit lines via a different transmission gate transistor. During read-out, the gate transistors of a selected cell are enabled, and the voltage on one of the digit lines builds up to the value of that cell's corresponding output. The polarity of the difference in voltages on the two digit lines is voltage sensed by a differential amplifier.

In a large memory, i.e., many cells coupled to a digit line or pair of digit lines, read-out and, hence, memory cycle time is undesirably slow when voltage sensing is employed. This is due to the fact that each cell adds capacitance to its associated digit lines, whereby the total capacitance of a line is quite high. In order to read out data from a cell by the voltage sensing technique, it is necessary to charge or discharge the capacitance on one of the digit lines. The charge (discharge) time is a function of the total line capacitance and the resistance of the charge path, which in this case includes the relatively high resistance conduction channel of an insulated-gate field-effect transistor.

BRIEF SUMMARY OF THE INVENTION

In arrangements embodying the invention, a four transistor flip-flop cell is employed, together with at least one transmission gate transistor and one digit input-sense output line for both write-in and read-out. In contrast to the prior art arrangement discussed above, the input-sense line is terminated in a low impedance during read-out (which rapidly discharges line capacitance and maintains the line at a fixed potential), and current flowing in the line is sensed.

BRIEF DESCRIPTION OF THE DRAWINGS

In the accompanyng drawings, like reference characters denote like components and FIGS. 1(*a*) and 1(*b*) are symbols used throughout the drawings to represent, respectively, P-type and N-type insulated-gate field-effect transistors.

DETAILED DESCRIPTION OF THE INVENTION

Figure 2:
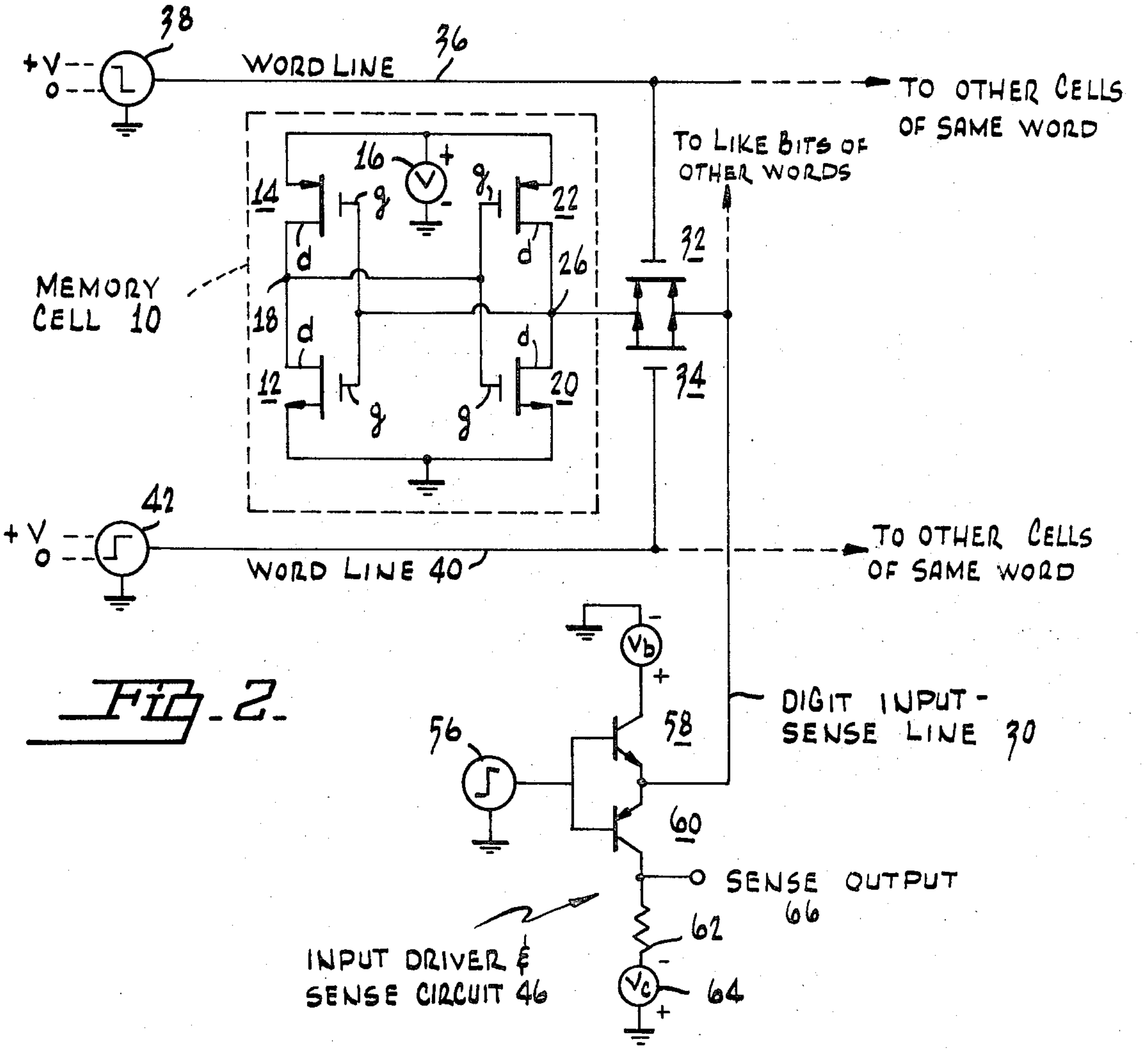
FIG. 2 is a schematic drawing of a memory cell embodying the invention and in which a dual transmission gate is employed.

The active devices which are preferred for use in practicing the invention are those of a class known in the art as insulated-gate field-effect transistors. For this reason, the circuits are illustrated in the drawings as employing such transistors, and will be so described hereinafter. However, this is not intended to preclude the use of other suitable devices and, to this end, the term "transistor," when used without limitation in the appended claims, is used in a generic sense.

An insulated-gate field-effect transistor may be defined generally as a majority carrier device that comprises a body of semiconductive material having a source and a drain in contact with the body and defining generally the ends of a conduction channel, or current carrying path, through the body. A gate (control electrode) overlies at least a portion of the conduction path and is separated therefrom by an insulator or region of insulating material. Since the gate is insulated from the body, it does not draw any current under steady state operating conditions, or at least it draws no appreciable current, whereby the gate of one transistor may be connected directly to either the source or drain of the other transistor with little or no steady state current flow through the connection.

Figure 1:
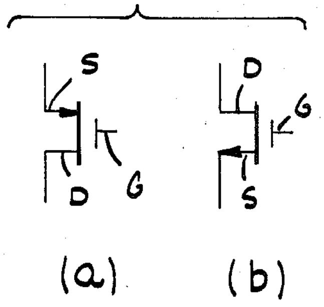

A transistor of this type may be either a P-type conductivity unit or an N-type conductivity unit. A P-type unit is one in which the majority carriers are holes, and an N-type unit is one in which the majority carriers are electrons. Enhancement type units are preferred to depletion type units. By way of definition, a P-type enhancement unit has a relatively high conductivity conduction path when the gate voltage is negative relative to the source voltage, and has a very, very low conductivity when the gate and source voltages are equal, or the gate voltage is positive relative to the source voltage. Such a device is indicated in the drawings by the symbol appearing in FIG. 1(*a*), in which the source electrode is identified by an arrowhead pointing inwardly, and the drain may be identified as the other electrode on the same side of the device. As is known, insulated-gate field-effect transistors are bidirectional devices in which current can flow in either direction through the conduction channel. When a P-type device is employed as a bidirectional device, both the source and drain electrodes are shown having arrowheads pointing toward the body.

An N-type enhancement unit, on the other hand, is one which has a relatively high conductivity channel when its gate voltage is positive relative to its source voltage, and which has a very, very low conductivity when the source and gate voltages are equal, or when the gate voltage is negative relative to the source voltage. Such a device is represented in the drawings to be described by the symbol given in FIG. 1(*b*). Again, the source is that electrode to which an arrowhead is affixed. In this case, however, the arrow points away from the body. When such a device is used as a bidirectional device, this fact is indicated in the drawings by arrowheads on both the source and drain electrodes.

In the embodiment of the invention illustrated in FIG. 2, a four-transistor memory cell is contained within the dashed box 10. This cell includes a first N-type transistor 12 and a first P-type transistor 14 having their conduction paths connected in series in a first circuit branch between a point of reference potential, illustrated as circuit ground, and the positive terminal of a source 16 of V volts operating potential, which may be, for example, a battery. The drains of these transistors are connected by negligible impedance means to a junction 18 and to the gates of a second N-type transistor 20 and a second P-type transistor 22. Transistors 20 and 22 have their conduction paths connected in series with each other in a second circuit branch which is in parallel with the first circuit branch. The drains of transistors 20 and 22 are connected by negligible impedance means to a junction 26 and to the gates of the transistors in the first circuit branch.

The memory cell just described is bistable and, in either steady state draws no appreciable current, whereby the steady state power dissipation is very, very low. In particular, when the transistors 12 and 14 have +V volts applied at their gates, transistor 12 is biased on and transistor 14 is biased off. The voltage at junction 18 then is zero volts and little current flows through the conduction path of transistor 14. The zero volts is applied at the gates of the other transistors 20 and 22, biasing transistor 20 in the nonconducting condition and biasing transistor 22 on. The voltage at junction 26 then is approximately +V volts, which voltage maintains the transistors 12 and 14 in the state indicated above. The memory cell may be considered as storing a binary "1" bit under these conditions.

In the other stable state, transistors 12 and 22 are biased off and transistors 14 and 20 are biased in the on condition. The voltage at junction 18 then is +V volts, and the voltage at junction 26 is at ground potential. The memory cell may be considered as storing a binary "0" bit of data under these conditions.

Junction 26, common to the drains of transistor 20 and 22, serves as a common input/output terminal for the memory cell 10. This terminal is coupled to digit input-sense line 30 by way of a complementary transmission gate. This gate comprises a P-type transistor 32 and an N-type transistor 34 having their conduction paths connected in parallel between the terminal 26 and the line 30. Digit input-sense line 30 is connected at one end to an input driver and sense circuit 46, the purpose of which is to supply the digit input signal to the memory cell 10 during a write-in operation, and to properly terminate the line and provide an indication of the state of the cell during the read-out operation. The particular circuit 46 illustrated in the drawing is described in detail in Pat. 3,275,996, issued to J. R. Burns and assigned to the assignee of the present invention. Hence, the circuit 46 will not be described in detail here.

Transistor 32 has its gate connected to a first word control line 36, which is driven from a source 38 of control signals. Transistor 34 has its gate connected to a second word line 40 which, in turn, is driven from a source 42 of control signals. The word lines 36 and 40 may be common to all of the memory cells for a word of information, e.g., the memory cells in a row of the memory, and the digit-sense line 30 may be common to all of the cells of like bit significance in the several words, e.g., to all of the cells in a column of the memory. Such a memory arrangement is illustrated in block form in FIG. 3.

Figure 3:
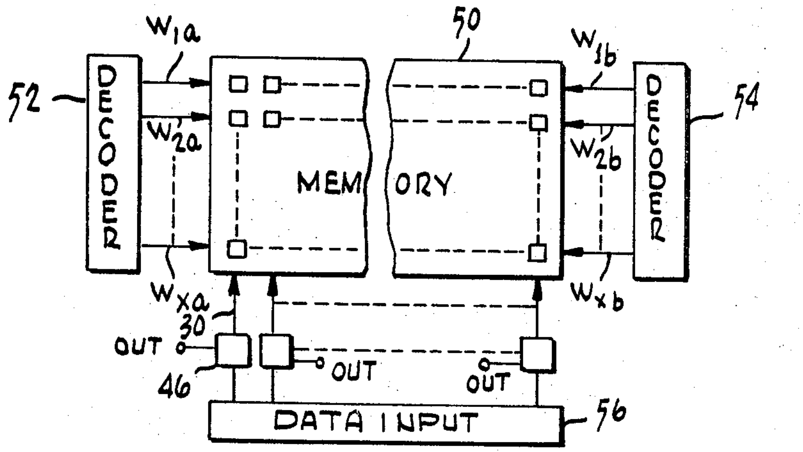
FIG. 3 is a block diagram of a word organized memory system employing the cell arrangement of FIG. 2.

As illustrated in FIG. 3, the memory cells with their associated transmission gates are arranged in rows and columns of the memory 50. The cells of each row may be considered to be storing the bits for one word or informatin, and all of the cells in the same cdlumn of the memory store the bits of like significance in the several words. Each row of cells has associated therewith first and second word lines. For example, the top row of cells is controlled by a first word line $W_{1a}$ and a second word line $W_{1b}$. The lines $W_{1a}$ and $W_{1b}$ may be the word lines 36 and 40 in the FIG. 2 arrangement. All of the word lines $W_{1a}$ . . . $W_{xa}$ are shown connected to the output of a first decoder 52, in which case the control source 38 (FIG. 2) is a portion of that decoder. In like manner, the word lines $W_{1b}$ . . . $W_{xb}$ are connected to the output of a second decoder 54. In that case, the control source 42 (FIG. 2) is a portion of the decoder 54. Each column of cells has associated therewith a separate digit input-sense line, e.g. line 30, connected to a driver and sense circuit, e.g. 46, and all of the driver-sense circuits receive control signals from a data input source 56.

Consider now the operation of the arrangement of FIG. 2 during write-in. Data input source 56 supplies input signals having either a first value or a second value of approximately +V volts and zero volts, respectively. When the input is +V volts the NPN bipolar transistor 58 in the driver-sense circuit is biased on and operates as an emitter follower. PNP transistor 60 is biased off at this time, and the voltage on the digit-sense line 30 is at +V volts (neglecting emitter-base voltage drops). On the other hand, when the input voltage is at ground potential, transistor 58 is biased off and transistor 60 is biased on as an emitter follower, whereby the voltage on the digit-sense line 30 is at ground potential.

When the memory cell 10 is not selected, the voltage on word line 36 is maintained at +V volts and the voltage on word line 40 is maintained at ground potential. Both of the transmission gate transistors 32, 34 then are biased off, and the voltage on the digit line 30 can have no effect on the state of the flip-flop. When the cell 10 is selected, the voltage on word line 36 is switched to ground potential, and the voltage on word line 40 is switched to +V volts. The transistors 32 and 34, during write-in, are biased "on" and operate in the common source mode, or the source follower mode, or essentially conduct no current, depending upon the voltages at junction 26 and on the digit input line 30. The operation of these transistors for the different conditions is summarized in Table 1.

TABLE 1

| Data inputs | Initial voltage jct. 26 | Transistor 32 | Transistor 34 | Final voltage jct. 26 |
|---|---|---|---|---|
| 0 | 0 | NC | X | 0 |
| +V | 0 | CS | SF | +V |
| 0 | +V | SF | CS | 0 |
| +V | +V | X | NC | +V |

CS=Common source.
SF=Source follower.
X=Transistor on but essentially conducting no current.
NC=Not conducting.

By way of example, let it be assumed that the voltage at output terminal 26 is at ground potential (transistor 20 biased on) and that it is desired to write-in a binary "1." Input source 56 then supplies +V volts on the input-sense line 30. When the voltages on word lines 36 and 40 are switched to ground potential and +V volts, respectively, both of the transistors 32 and 34 become conducting. Transistor 32 operates in the common source mode, and transistor 34 operates in the source follower mode. The parallel combination of transistors 32 and 34 in series with transistor 20 essentially form a voltage divider. In order to change the voltage at junction 26 rapidly to a value sufficient to switch the state of the cell, the transistors 32 and 34 are selected to have lower impedance conduction paths than that of the transistor 20 (and 22) for the same value of forward bias, whereby most of the input voltage will appear between junction 26 and ground. At the same time, in order to provide fast switching of the cell, the transistors 12 and 14 are selected to have lower impedance conduction paths than the transistors 20 and 22 for fast regeneration.

When the cell is storing the binary "1" (voltage at terminal 26 equals +V volts) and it is desired to write-in a binary "0," data input source 56 operates to supply ground potential to the input line 30. When the voltage on word lines 36 and 40 then are switched to ground potential and +V volts, respectively, transistor 34 turns on and operates in the common source mode, and transistor 32 turns on and operates in the source follower mode. Because of the lower impedances of these transistors as compared to the impedance of the conducting transistor 22, the voltage at output terminal 26 is switched rapidly from +V volts to ground potential.

Consider now the method of sensing the state of the cell. During sensing, data input source 56 supplies ground potential (approximately) at the bases of transistors 58 and 60 to turn on transistor 60. Transistor 60, as will be apparent, operates in the grounded base configuration to provide a very low impedance termination at the lower end of sense line 30, whereby the capacitance of the line is rapidly discharged and the line 30 is maintained thereafter at ground potential. Transmission gate transistor 34 is not used during sensing. For this reason, its gate is maintained at ground potential. Tranistor 32, however, has ground potential applied to its gate electrode from the word line 36. Let it be assumed that the cell is storing a binary "0," in which case the output voltage at junction 26 is at ground potential. With ground potential at terminal 26, and ground potential on the sense line 30, essentially no current flows through the transistor 32. Accordingly, no current flows in the sense line and through transistor 60 to the output terminal 66.

Let it be assumed now that the cell is storing a binary "1," in which case the voltage at output terminal 26 is a +V volts. With +V volts at the output terminal and ground potential on the sense line 30, transistor 32 turns on when its gate voltage is lowered to ground potential. The transistor 32 operates in the source follower mode and current flows, in the conventional sense, from the positive terminal of bias source 16 through transistors 22 and 32 to the sense line, and through the emitter-collector path of transistor 60 and load resistor 62 to the negative terminal of bias source 64. The current flowing through load resistor 62 produces a voltage drop across this resistor which may be sensed at the output terminal 66 of the sense circuit.

Figures 4, 6, 7, 10:
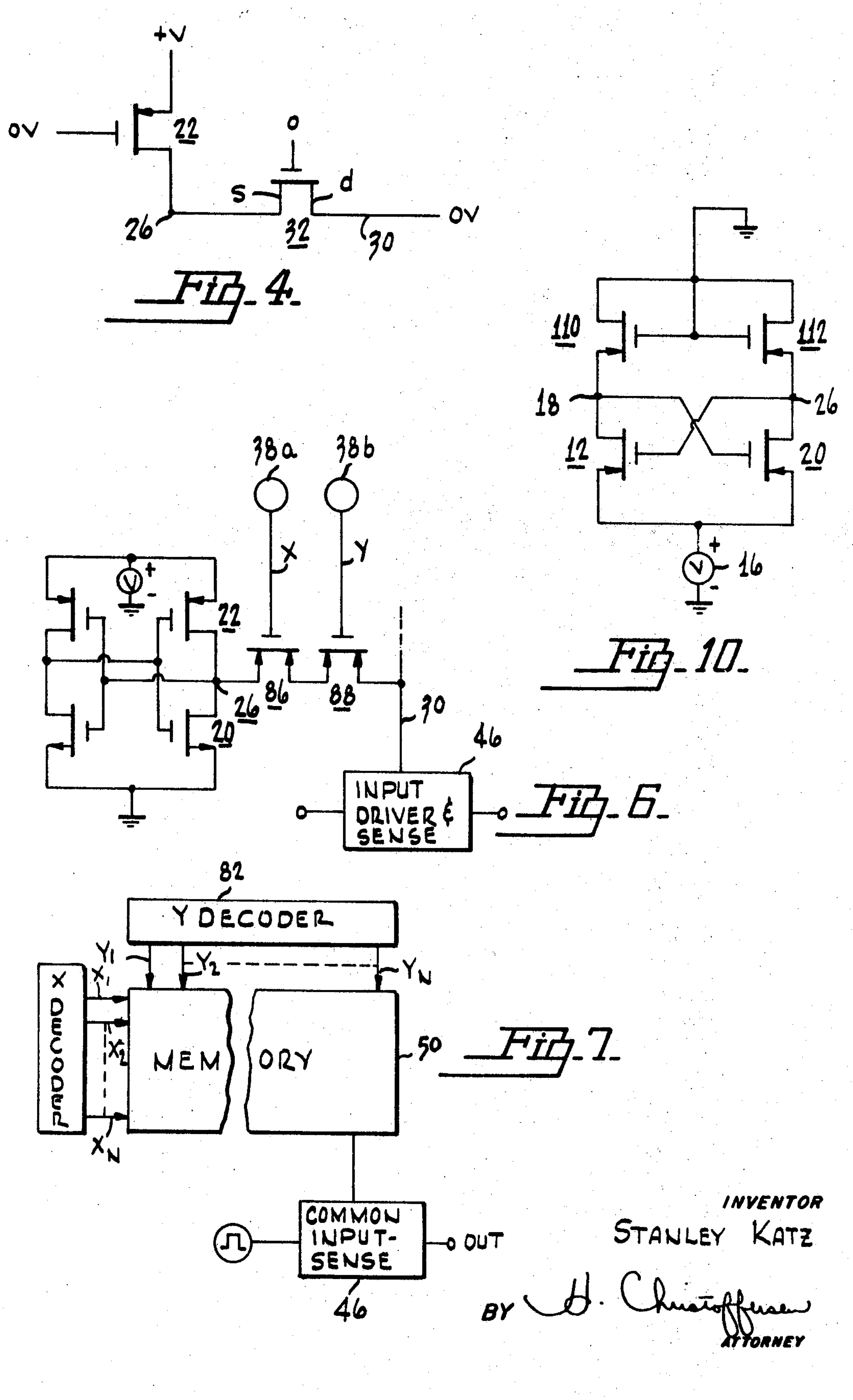
FIG. 4 is a schematic diagram of a portion of the FIG. 2 circuit useful to an understanding of the sensing operation.
FIG. 6 is a schematic diagram of a memory cell embodying the invention which is suitable for use in a coincident address system.
FIG. 7 is a block diagram of a memory system employing cells of the type illustrated in FIG. 6.
FIG. 10 is a schematic diagram of a circuit which could be substituted for the storage portion of the cells illustrated in the other figures of the drawing.

In order for the read-out to be nondestructive, a requirement is that the voltage at the output terminal 26 of the cell must not change sufficiently to switch the cell. FIG. 4 is illustrative of the current path when the cell is storing a binary "1" during read-out. As will be observed in FIG. 4, the conduction path of transistor 22 and the conduction path of transistor 32 appear in series between the +V volt source 16 and the digit sense line 30 (which is maintained at ground potential). Initially, the voltage at terminal 26 is at +V volts. This voltage decreases in value when the transistor 32 is turned on. The amount by which the voltage falls is a function of the relative impedances of the transistors 22 and 32.

By way of example, the transistor 32 may be selected to have an impedance which is approximately one-half that of the transistor 22 for the same value of forward source-gate bias (and equal to that of transistor 34). Under those conditions, the combined impedance of the transistors 32 and 34 is approximately one-fourth that of the transistor 22 during write-in. However, during read-out, transistor 34 is out of the circuit. Thus, at the instant transistor 32 becomes conductive, the impedance of its conduction path is approximately one-half that of the transistor 22. Transistor 32, however, operates in the source follower mode during read-out, whereby the voltage between its source and gate decreases as the voltage at 26 falls from +V volts. Accordingly, the impedance of the transistor 32 increases as the voltage at output terminal 26 falls from +V volts. It has been found that, when the transistor 32 is selected to have an impedance of about one-half that of the transistor 22 for the same source-gate forward bias, the voltage at output terminal 26 only will fall to approximately +0.7 v., which voltage is not sufficient to switch the state of the cell, whereby the sensing of the cell is nondestructive of the stored information.

Because of the current sensing feature provided by the transistor 60 and load resistor 62, the line capacitance is rapidly discharged, and the current flowing in the line is sensed immediately across the resistor 62. Moreover, maximum current flows at the instant transistor 32 becomes conductive. Therefore, reading is essentially instantaneous. By contrast, the prior art voltage sensing arrangement requires that the sense line be terminated in a high impedance, and that the capacitance of the sense line 30 be charged up toward the value of voltage at the output terminal 26 of the memory cell. Since the only path for charging this capacitance is through one or more insulated-gate field-effect transistors, and since the impedance of such transistors is fairly high, it can be seen that there is a substantial delay before the capacitance on the sense line will be charged, and a corresponding delay in reading out or sensing the state of the cell. By way of example, read-out times in the 5–10 nanosecond range have been observed for a heavily loaded digit line when using the current sensing technique. Faster write-in operation results by further decreasing the impedance of transistor 34, which has little effect on cell read-out operation since transistor 34 is then biased off.

It should be mentioned that the transmission gate transistor 34 could be used for read-out rather than the transistor 32. In that event, the voltages on the word lines 36 and 40 would be maintained at +V volts during read-out. Current would flow on the sense line only when the cell 10 was storing a binary "0" in that case, assuming that the voltage on the sense line 30 were maintained at +V volts rather than at ground potential, as in the previous example. The sense current would flow through the transistor 58 rather than the transistor 60, whereby it would be necessary to provide an impedance in the collector circuit of transistor 58, and an output terminal at that collector.

Figure 5:
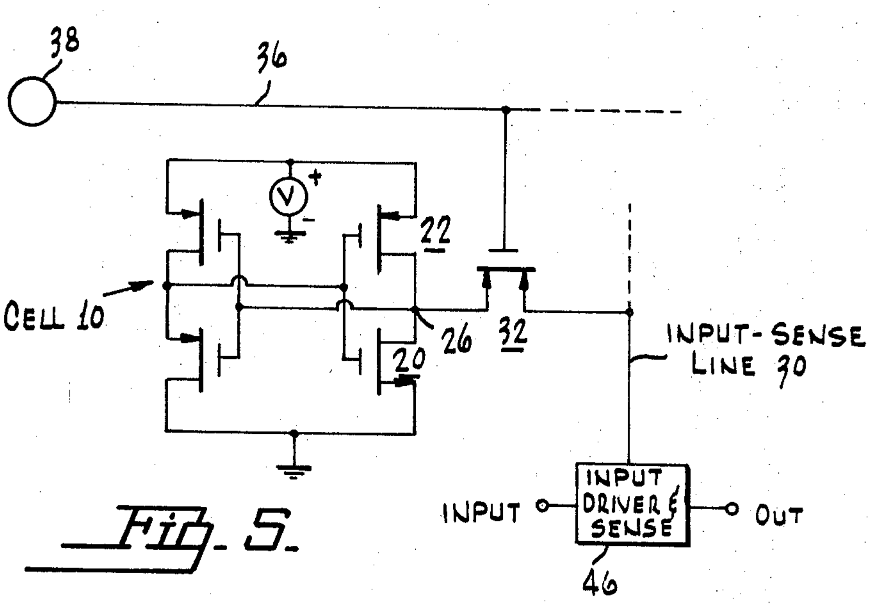
FIG. 5 is a schematic diagram of a memory cell embodying the invention in which a single transmission gate transistor is employed.

The embodiment illustrated in FIG. 5 differs from that of FIG. 2 structurally by the elimination of transmission gate transistor 34 and its associated word line 40. When the cell 10 is not selected, the voltage on word line 36 is maintained at +V volts, whereby transmission gate transistor 32 is biased off, just as in the case of the FIG. 2 arrangement. Also, during the sensing operation, word line 36 is switched from +V volts to ground potential, and transistor 32 operates as a source follower, just as in the case of the FIG. 1 circuit.

The difference in operation between the FIG. 2 and FIG. 5 circuits occurs during write-in. Transmission gate transistor 32 operates in the common source configuration when the voltage on the sense line is +V volts and the voltage at output terminal 26 is at ground potential. However, when these two voltages have the opposite value, the transistor 32 operates in the source follower mode. In this mode, the impedance of the transistor 32 increases as the voltage at output terminal 26 falls in value. In order to compensate for the source follower mode of operation, and to assure that the voltage at terminal 26 will be driven sufficient toward zero volts to switch the flip-flop, control source 38 operates to supply a voltage of −V volts on the word line 36 during write-in. This negative voltage has the effect of overdriving the transistor 32 so that the impedance of its conduction path remains very low relative to that of the transistor 22.

A word organized memory employing the cell arrangement of FIG. 5 would differ from that shown in FIG. 3 in that the decoder 54 and its associated word lines $W_{1b} \ldots W_{xb}$ would be eliminated. Of course, each of the cells in the memory 50 would take the form of the cell 10 and the transmission gate 32 of FIG. 5.

FIG. 6 is a schematic diagram of a memory cell arrangement suitable for use in a coincident address memory comparable to that of a coincident current memory. Such a memory is shown in block form in FIG. 7. The memory cells are arranged functionally in rows and columns in the memory 50. Each different row of memory cells has associated therewith a different row address line $X_1 \ldots X_n$, and these row lines are selectively enabled by a row decoder 80. Each different column of cells has associated therewith a different column address line $Y_1 \ldots Y_n$, which column address lines are selecitvely enabled, one at a time, by the outputs of a column or Y decoder 82. A common input driver-sense circuit 46 is employed for all of the cells.

The cell as shown in FIG. 6 differs structurally from that illustrated in FIG. 5 in that two transmission gate transistors 86 and 88 have their conduction paths connected in series between the output terminal 26 of the memory cell and the input-sense line 30. Transistor 86 has its gate electrode connected to the row address line X for that cell, and the transistor 88 has its gate electrode connected to the column address Y for that cell. Both of the transistors 86 and 88 must be biased on to write data into the cell, and both must be biased on to sense the state of the cell. The cell otherwise operates the same as that of the cell illustrated in FIG. 5 and described previously.

Briefly stated, either or both of the gates of transistors 86 and 88 is maintained at +V volts when the cell is not selected. To write information into the cell, the voltages at the gates of both of these transistors are switched from +V volts to −V volts. During the read-out or sense operation, the gates of these transistors are each maintained at ground potential (or slightly positive with respect to ground).

In the circuit of FIG. 5, the transmission gate transistor 32 could be an N-type transistor rather than a P-type transistor. In FIG. 6, the two transmission gate transistors 86 and 88 could be N-type transistors. In each case, it is necessary then to provide the necessary changes in the polarities of the control pulses applied to the gates of those transistors and to modify the sense circuit 46, all in the manner previously discussed in connection with the circuitry of FIG. 2.

Figure 8:
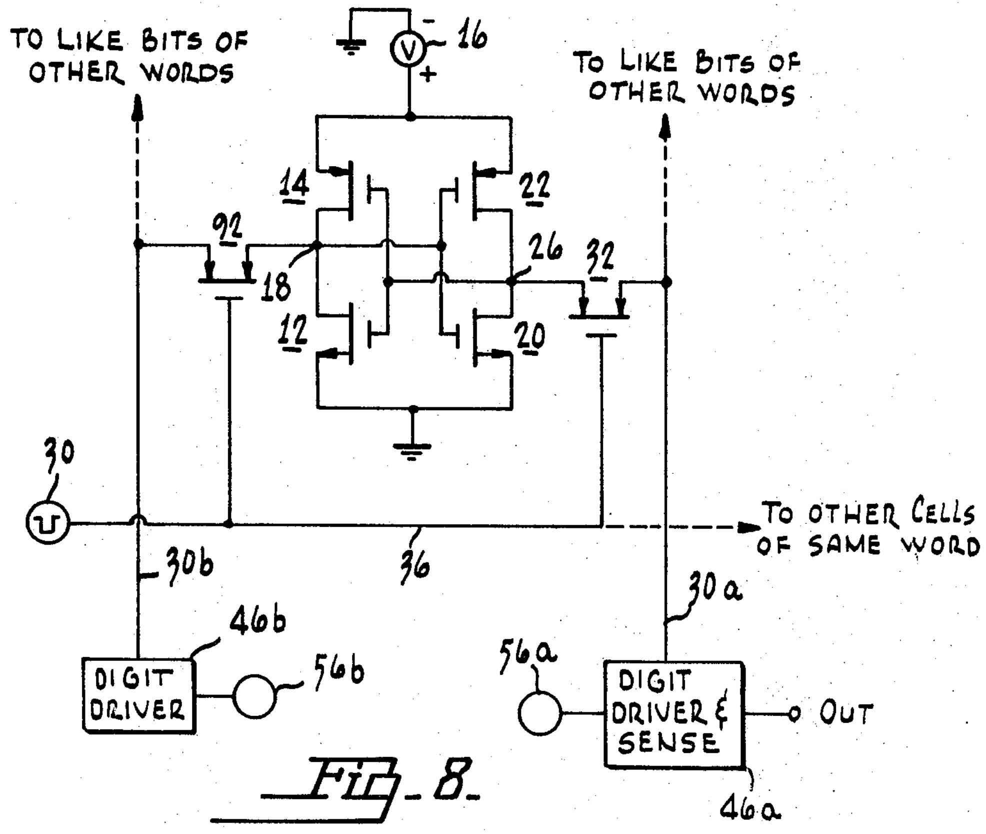
FIG. 8 is a schematic diagram of a memory cell embodying the invention in which "push-pull" drive is employed.

FIG. 8 is an embodiment of the invention which employs a "push-pull" drive technique during write-in. This circuit differs structurally from the circuit of FIG. 5 in that a second P-type transmission gate transistor 92 has its conduction channel connected between the terminal 18 of the storage cell and a second digit input line **30*b*. This line 30*b* is terminated in a digit driver circuit 46*b*, which may be identical to the other digit driver and sense circuit 46*a*. Transistor 92 has its gate connected to the same word line 36 as the gate of the first transmission gate transistor 32. Because of the push-pull drive during write-in, it is unnecessary to employ transistors of different impedances in the storage portion of the cell. That is to say, in the FIG. 8 arrangement, the impedances of the transistors 12 and 14 are the same as the impedances of the transistors 20 and 22. The two transmission gate transistors 32 and 92, however, have impedances which are smaller than those of the transistors 12, 14, 20 and 22** for the reasons previously explained.

During a write operation, the voltage on one digit line **30*a*, 30*b* is at ground potential, while the voltage on the other digit line is +V volts. Let it be assumed that the cell is storing a binary "1" bit. The voltage at terminal 18 then is at ground potential and the voltage at terminal 26 is at +V volts. To change the state of the cell, i.e., to write in a binary "0," digit driver 46*a* supplies ground potential to the digit line 30*a*, and digit driver 46*b* supplies +V volts to the line 30*b*. When the control source 38 then switches the voltage on word line 36 from +V volts to ground potential, both of the transistors 32 and 92 turn on. Transistor 92 operates in the common source mode to change the voltage at terminal 18 from ground potential to +V volts. Transistor 32 operates in the source follower mode at this time to reduce the voltage at terminal 26 from +V volts. The voltage at this junction 26 is driven to ground potential when the voltage at terminal 18 rises sufficiently to turn off transistor 22 and to turn on transistor 20. Because of the push-pull drive provided by transistors 32 and 92, fast write-in is achieved even though all of the transistors 12, 14, 20 and 22** have the same value of impedance for like bias drive.

To change the state of the cell from binary "0" storage to binary "1" storage, the voltage on digit line **30*a* is raised to +V volts and the voltage on line 30*b* is lowered to ground potential prior to the write-in pulse from source 38. In that event, transistor 32 operates in the common source mode and transistor 92** operates in the source follower mode.

To sense the state of the cell, both of the digit lines **30*a* and 30*b* are maintained at ground potential. Control source 38 also applies ground potential at the gates of the transistors 32 and 92. If the cell is storing a binary "1", little or no current flows through the transistor 92, since both the source and drain electrodes of this transistor are at ground potential. The other transistor 32 has +V volts applied at its source electrode, whereby this transistor operates as a source follower, and current flows through the transistor and over the digit line 30*a* to the driver-sense circuit 46*a*. As in the case of the FIG. 2 circuit, read-out is nondestructive since transistor 32 operates as a source follower, and the impedance of the conduction path of this transistor 32 increases as the voltage at terminal 26 decreases from +V volts. The relative impedances of transistors 22 and 32 are such that the voltage at terminal 26** cannot fall sufficiently from +V volts to switch the state of the cell.

If the cell is storing a binary "0," little or no current flows in the digit line **30*a* since the source and drain electrodes of the transistor 32 have the same potential as each other and as the gate electrode. Transistor 92, however has +V volts applied at its source electrode, and ground potential applied at its gate and drain electrodes. This transistor then operates as a source follower, and current flows over the digit line 30*b*. If the digit driver 46*b* is the same as the digit driver 46*a*, this current flowing in digit line 30*b* may be sensed at the output of the circuit 46*b*. In the usual case, current only need be sensed in the digit line 30*a***, in which case current flowing in this line will produce a change in output to indicate sensing of binary "1" bit, and no current flowing in the line and producing no change in output may denote storage of a binary "0" bit.

For a "bit organized" or coincident address memory an additional transmission gate transistor (not shown) could be connected in series with each of the transistors 32 and 92, in a manner similar to that shown in FIG. 6. One transistor in each gate then would be controlled by the X address, and the other transistor in each gate would be controlled by the Y address.

Figure 9:
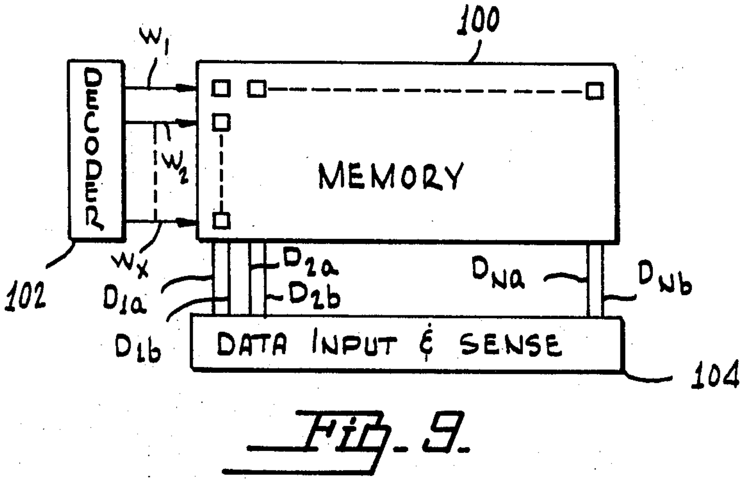
FIG. 9 is a block diagram of a memory system employing cells of the type illustrated in FIG. 8.

A word organized memory employing the arrangement of FIG. 8 is shown in block form in FIG. 9. The various cells and their transmission gates are functionally arranged in rows and columns in the memory 100. Each row of cells has a different word line $W_1 \ldots W_x$ associated therewith, which word lines are enabled selectively, one at a time, by a decoder 102. The control source 38 of FIG. 8 then may represent one output stage of the decoder, and the word line 36 may be one of the word lines $W_1 \ldots W_x$ of FIG. 9. Each column of memory cells has associated therewith two digit lines, which digit lines are connected to a data input and sense unit 104. The digit lines 30_a_ and 30_b_ of FIG. 8 then are one of the pairs of digit lines, e.g., $D_{1a}$, $D_{1b}$, of FIG. 9, and the digit drivers 46_a_ and 46_b_ are different units in the data input and sense block 104.

The various memory cells thus far described have been illustrated as employing complementary transistor flip-flops, wherein each flip-flop has two cross-coupled circuit branches, and each circuit branch includes one P-type transistor and one N-type transistor. One important advantage of such a cell is that little or no current flows through the transistors during the steady state operation and, hence, there is very little power dissipation in the steady state. In some cases, it may be desirable to employ transistors of the same conductivity type throughout the flip-flop. In that event, the storage portion of the memory cell may take the form illustrated schematically in FIG. 10, in which the upper transistors 110 and 112 in the first and second circuit branches are P-type transistors having their gate electrodes connected to a source of fixed potential. By way of example, these gates are shown as being connected to the drains of the like transistors and maintained at ground potential. The sources of the remaining transistors 12 and 20, which also are P-type, are connected to the positive terminal of the source 16. The transistors 110 and 112 operate as variable impedance loads for the respective transistors 12 and 20. Although this arrangement dissipates power in the steady state condition and is not as fast in operation in the general case, the arrangement has the advantage that it is easier to fabricate on a single substrate with state-of-the-art fabrication techniques.

The phrases "negligible impedance" and "negligible impedance means" have been used at various places herein to describe the manner in which the two transistors of a flip-flop circuit branch are connected to each other and cross-coupled to the transistors in the other circuit branch. In the schematic drawings of the circuits, these connections are shown as wires and, as is known, a short wire has very little resistance, i.e. essentially zero. However, in the actual construction of the circuit, the connection may have some incidental impedance. An example is a circuit constructed in monolithic form employing integrated circuit techniques. It frequently happens there that so-called cross-overs of interconnections cannot be avoided for practical purposes. In that event, one of the interconnections sometimes is made via a tunnel in the semiconductor material or by a "well." The interconnection sometimes may even include a small section of semiconductive material. Any of these techniques may introduce some incidental impedance. The phrases "negligible impedance" and "negligible impedance means" are used in a generic sense herein and in the appended claims to include incidental impedances.

What is claimed is:

1. The combination comprising:

a memory cell including first, second, third and fourth transistors each having an input means and an output means defining the ends of a conduction path through the transistor and having also a control means; first negligible impedance means connecting the output means of the first and second transistors to each other and to the control means of at least the third transistor; and negligible impedance means connecting the output means of the third and fourth transistors to each other, to a common input-output point and to the control means of at least the first transistor;

a common input-sense line;

fifth and sixth transistors of first and second conductivity type, respectively, each transistor having a conduction path defined by first and second electrodes and a control electrode for controlling the conductivity of said path;

means coupling the conduction paths of said fifth and sixth transistors in parallel between said input-sense line and said input-output point for providing a direct current carrying path therebetween;

means connected at the control electrode of the sixth transistor for switching said sixth transistor from the "off" to the "on" condition only during a write-in operation;

a source of data input signals coupled to said input-sense line and operative during a write-in operation to apply a voltage of either a first value or a second value to said line;

current sensing means terminating said input-sense line in a low impedance and maintaining said line at a fixed potential during a sense operation; and means connected to the control electrode of said fifth transistor for switching the fifth transistor from the "off" condition to the "on" condition during both the sensing operation and the write-in operation of said cell.

2. The combination as claimed in claim 1, wherein the impedance of the conduction path in the fifth transistor is less than the impedance of the conduction path in each of the third and fourth transistors for the same value of forward bias.

3. The combination as claimed in claim 1, wherein: all of the transistors are insulated-gate field-effect transistors; and said fifth transistor is operated in the source follower mode during a sensing operation.

4. The combination as claimed in claim 3, wherein the said input means, output means and control means are the source, drain and gate, respectively; wherein the first and third transistors are of one conductivity type and the second and fourth transistors are of a second conductivity type; and including: negligible impedance means connecting the gates of the second and fourth transistors to the gates of the first and third transistors, respectively.

5. The combination as claimed in claim 4, wherein the impedance of each of the fifth and sixth transistors is less than the impedance of each of the third and fourth transistors for the same value of forward source-gate bias.

6. The combination comprising:

a memory array of storage cells functionally arranged in rows and columns;

a pair of row lines for each row of storage cells;

a separate digit input-sense output line for each column of cells;

each cell comprising first, second, third fourth, fifth and sixth insulated-gate field-effect transistors each having a source and a drain defining the ends of a conduction path through the transistor and having also a gate; negligible impedance means connecting the conduction paths of the first and second transistors in series in a first circuit branch and connecting the conduction paths of the third and fourth transistors in series in a second, parallel circuit branch; negligible impedance means cross-coupling the gate of the first transistor to the drain of the third transistor and cross-coupling the gate of the third transistor to the drain of the first transistor; means connecting the conduction paths of said fifth and sixth transistors in parallel between the drain of the third transistor and the associated input-sense line, and their gates to a different one of the associated pair of row lines;

separate digit drive-current sensing means coupled to each input-sense line and including means for applying a voltage having either a first value or a second value to its associated input-sense line during a write-in operation, and means for terminating the associated input-sense line in a low impedance and maintaining the voltage thereon at a fixed value during a sensing opertaion; and means connected to said row lines for switching the fifth and sixth transistors connected thereto from the "off" condition to the "on" condition during the write-in operation and only the fifth transistor during the sensing operation of the cells associated with that row line.

7. In combination with a memory cell having at least one input-output point to provide the means for writing binary information into said cell and for sensing the information stored therein; the improvement comprising:

a common data input-sense line;

first and second transistors of first and second conductivity type respectively, each transistor having a conduction path defined by first and second electrodes and a control electrode for controlling the conductivity of said path;

means coupling the conduction paths of said first and second transistors in parallel between said input-output point and said input sense line;

means connected at the control electrode of said first transistor for switching said first transistor from the "off" to the "on" condition only during a write operation; and means connected at the control electrode of said second transistor for switching said second transistor from the "off" to the "on" condition during both the write-in and sensing operations.

8. The combination as claimed in claim 7 further providing current sensing means terminating said input-sense line in a low impedance and maintaining said line at a fixed potential during a sense operation; and wherein said second transistor is operated in the source-following mode during the sensing operation.

References Cited

UNITED STATES PATENTS

| | | | |
|---|---|---|---|
| 3,431,433 | 3/1969 | Ball et al. | 340—173 XR |
| 3,457,435 | 7/1969 | Burns et al. | 307—304 X |
| 3,447,137 | 5/1969 | Fever | 340—173 |
| 3,275,996 | 9/1966 | Burns | 340—173 |
| 3,389,383 | 6/1968 | Burke | 340—173 |

OTHER REFERENCES

Miiller: NDRO Memory Cell, RCA Technical Notes, No. 659, November 1965.

Pleshko: Nondestructive Readout Memory Cell Using MOS Transistors IBM Tech. Discl. Bulletin, vol. 8, No. 8, January 1966, pp. 1142–1143.

Pleshko: FET Memory Cell With Low Standby Power and Hight Switching Speed, IBM Tech. Discl. Bulletin, vol. 8, No. 12, May 1966, pp. 1838–9.

Pleshko: Low-Power Flip-Flop, IBM Tech. Discl. Bulletin, vol. 9, No. 5, October 1966, p. 553.

TERRELL W. FEARS, Primary Examiner

J. F. BREIMAYER, Assistant Examiner

U.S. Cl. X.R.

307—279, 288, 291